United States Patent [19]
Habicht

[11] Patent Number: 5,257,772
[45] Date of Patent: Nov. 2, 1993

[54] BUTTERFLY VALVE

[76] Inventor: Helmut Habicht, 15 Royal Park Ter., Hilldsale, N.J. 07642

[21] Appl. No.: 964,664

[22] Filed: Oct. 22, 1992

[51] Int. Cl.$^5$ ............................................. F16K 1/22
[52] U.S. Cl. ...................................... 251/305; 251/306
[58] Field of Search ................................ 251/305, 306

[56] References Cited

U.S. PATENT DOCUMENTS

| | | | |
|---|---|---|---|
| 3,475,007 | 10/1969 | Faubes | 251/305 |
| 3,502,299 | 3/1970 | Phillips | 251/306 |
| 3,991,974 | 11/1976 | Bonafous | 251/306 |
| 4,060,220 | 11/1977 | Fischer | 251/306 |
| 4,462,567 | 7/1984 | Habicht | 251/297 |

Primary Examiner—John C. Fox
Attorney, Agent, or Firm—Patrick J. Pinto

[57] ABSTRACT

A sanitary butterfly valve including a closable disc member carried by a resilient valve seat. The valve seat is compressed between a housing and clamp plate while being retained by a first acute lip and a second acute lip. The compression of said valve seat causes its central portion to collapse inwardly to seal against the closed disc. This mounting of the disc member by the valve seat along with an axial biasing means provides a self-centering disc sealing arrangement. This butterfly valve is adapted to be actuated by an external means.

10 Claims, 2 Drawing Sheets

BUTTERFLY VALVE

BACKGROUND OF THE INVENTION

With regard to the classification of art, this invention is believed to be found in the general class entitled "Valves and Valve Actuation" and more particularly to the subclasses pertaining to rotary butterfly valves.

DESCRIPTION OF THE PRIOR ART

Butterfly valves are well known in the prior art. One example of the prior art is U.S. Pat. No. 4,462,567 as issued to Habicht on Jul. 31, 1984. This patent is soley owned by me and is incorporated by reference into the present invention, to the extent that the present law allows. It has been a long term goal in the art to provide a butterfly valve which can be used in the process of foods and pharmaceuticals. This valve must provide a clean through bore while providing a positive seal in the closed position. This needed valve must be constructed to facilitate its assembly and cleaning.

SUMMARY OF THE INVENTION

This invention may be summarized with respect to its objects. It is an object of this invention to provide and it does provide a butterfly valve which has a sanitary construction absent undercut portions or places for flowing materials to collect.

It is another object of this invention to provide and it does provide a butterfly valve seat and disc assembly which may be assembled or disassembled as a unit.

It is still another object of this invention to provide and it does provide a butterfly valve in which the disc is pivotally carried by the valve seat.

It is yet another object of this invention to provide and it does provide a butterfly valve in which the disc is self-centering.

It is still yet another object of this invention to provide and it does provide a butterfly valve in which abrasion between the valve seat and the disc is minimized by compressively shaping the valve seat.

In addition to the above summary, the following disclosure is detailed to insure adequacy and aid in the understanding of this invention. This disclosure, however, is not intended to cover each new inventive concept no matter how it may be disguised either by variations in form or additions by further improvements. For this reason, there has been chosen specific embodiments of a butterfly valve. The specific embodiments have been chosen for the purpose of illustration and description as shown in the accompanying drawings wherein:

Figure 1:
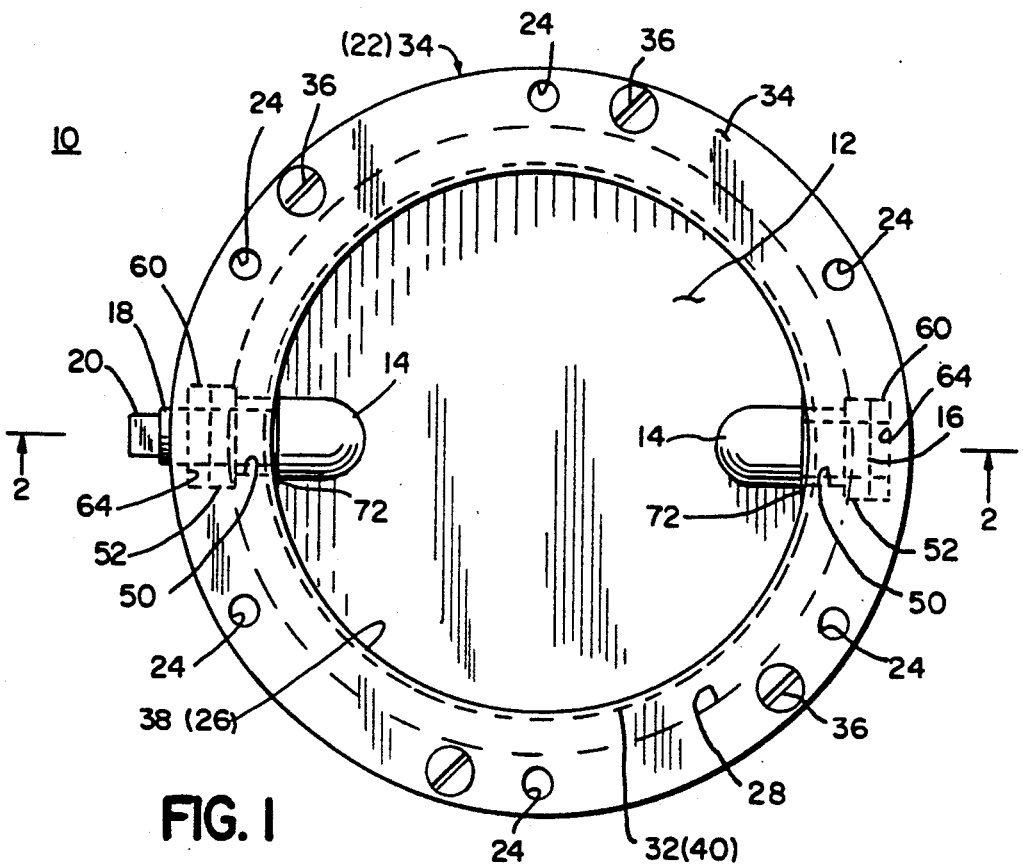
FIG. 1 represents a plan view of a butterfly valve of the present invention.

In the following description and in the claims, various details are identified by specific names for convenience. These names are intended to be generic in their application while differentiating between the various details. Corresponding reference characters refer to like members throughout the several figures of the drawings.

The drawing accompanying, and forming a part of this specification disclose details of construction for the sole purpose of explanation. It is understood that structural details may be modified without departing from the concept and principles of the invention. This invention may be incorporated in other structural forms than shown.

DETAILED DESCRIPTION OF THE INVENTION

Referring to FIG. 1, a butterfly valve generally identified as 10 is shown in plan view with its disc member 12 in a closed position. The disc member 12 is adapted to be rotated between a closed position, as shown, and an open position. The disc member 12 includes opposed hub portions 14 which are fixedly attached thereto. Extending from the hubs 14 are a short shaft member 16 and a long shaft member 18. The long shaft member 18 is sufficient in length to extend exterior of the valve 10. The long shaft 18 may be connected to a manual handle or to a powered rotary actuator. The end of the long shaft 18 may be provided with a square drive end 20, but other drive means may be provided.

Figure 2:
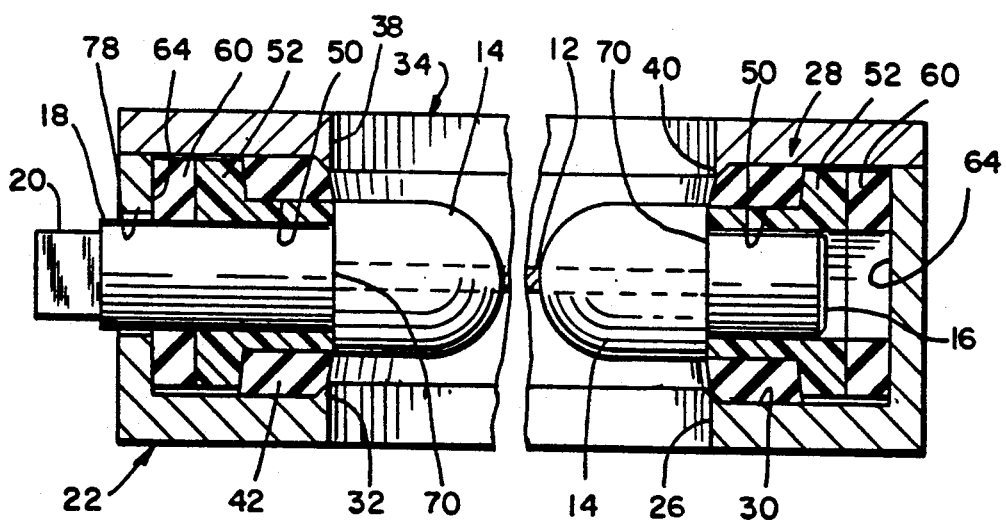
FIG. 2 represents a cross sectional elevation of the present invention, this view being enlarged and taken along line 2—2 of FIG. 1.

Referring now to FIG. 2, it may be seen that each of the shaft members 16 and 18 are reduced in diameter relative to the hubs 14. The disc member 12 including its hubs 14, and shafts 16 and 18 are preferably made of a stainless steel material. The hubs 14 have a smooth blended surface into the disc 12 to minimized pockets for the collection of materials passing thereover. The disc member 12 is highly polished by means of a electro-polishing process.

Referring again to FIG. 1, the butterfly valve 10 includes a housing 22 which is adapted to be connected to a flange of an adjacent apparatus such as a conduit, funnel, hopper, or the like. The housing 22 is provided with plurality of through apertures 24 for making the connection. This housing 22 is shown as having a circular exterior outline but other outlines may be used when it is necessary to match existing equipment.

Figure 5:
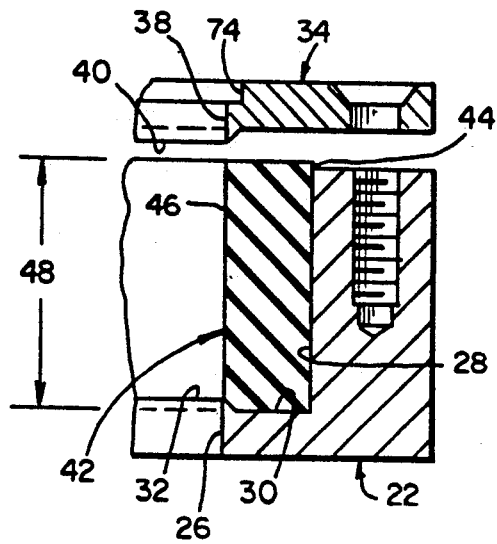
FIG. 5 represents a fragmentary cross-sectional view of the valve seat prior to being compressed by a clamp plate.
Figure 3:
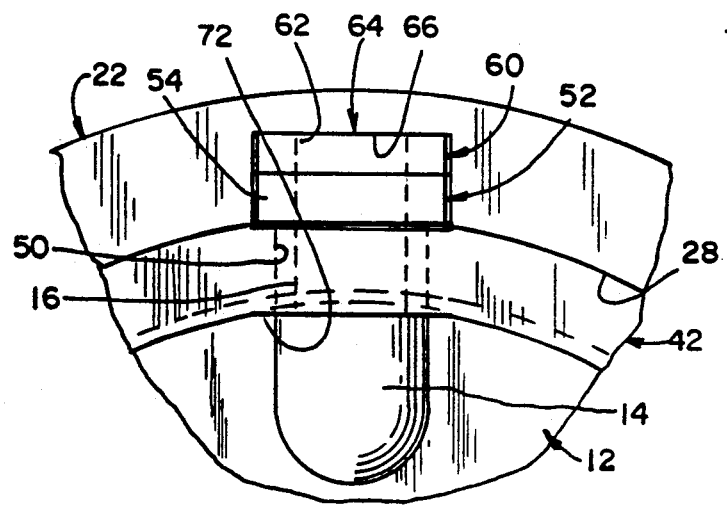
FIG. 3 represents a fragmentary plan view of a recess portion of the present invention, This view being in the same scale as FIG. 2.

Referring now to FIGS. 2; 3; and 5, the housing 22 may be seen in detail. This housing 22 includes a first cylindrical through bore 26. A counterbore 28, more clearly seen in FIG. 3 and FIG. 5 is formed in the housing in concentric alignment with the first through bore 26. The counter bore 28 has a determined depth so as to provide a shelf portion 30. This shelf portion 30 has a contoured edge 32 which may be described as a first acute lip. This first acute lip 32 has one of its surfaces in line with the through bore 26 and its other surface inclined at 45 degrees. The apex of the lip 32 extends 1.6 mm. (0.062 in.) above the shelf portion. The angle of the acute lip 32 may be in the range between 30 and 50 degrees. As previously noted, 45 degrees is preferred.

Figure 6:
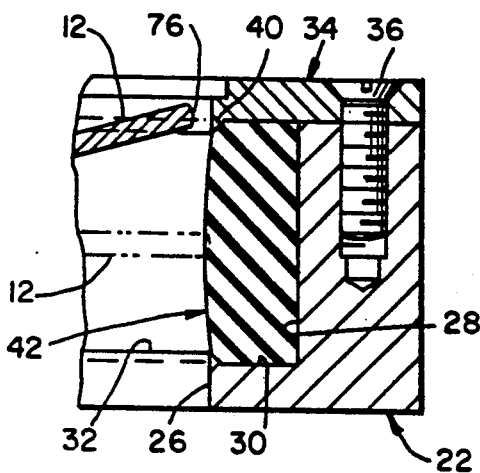
FIG. 6 represents a view of the valve seat of FIG. 5 after compression by the clamp plate.

Referring now to FIGS. 1 and 2, a clamp ring 34 is removably fastened to the housing 22 by means of recessed screws 36. The screws 36 are shown as being of the flat head type, as seen in FIG. 5 and 6, but other types of fasteners such as recessed shoulder bolts may be used for alignment. The clamp plate 34 has s second through bore 38 which is substantially the same size as the first through bore 26. The clamp plate 34 is formed with an lip portion 40, which may be described as a second acute lip member. This second lip member 40 is positioned in opposed alignment with said first acute lip member 32. It is preferred that each of the lip members 32 and 40 be substantially equal.

Referring now to FIG. 1 and 5, the valve seat is preferably made of a resilient material such as a 40 durometer FDA approved rubber. Other resilient materials may be used in non-sanitary applications of the valve 10. This valve seat 42 has an outside diameter 44, an inside diameter 46, and a free length 48. The outside diameter 44 is sized to closely fit into the counterbore 28. The Inside diameter 46 is substantially the same as the bores 26 and 38. The free length 48 is slight longer than the depth of the counterbore 28. For example, with a counterbore depth of 34.9 mm.(1.375 in.) a free length of 35.7 mm (1.406 in.) provides the desired results.

Referring again to FIGS. 1 and 2, the valve seat 42 is provided with a transverse aperture 50. This transverse aperture 50 is formed in the center of the valve seat 42 while the free length is . compressed to the depth of the counterbore 28. This forming of the transverse aperture 50 may be done in the housing 22 or in a suitable fixture. Forming the transverse aperture 50 in this manner insures that the aperture 50 will be round and in a proper and desired alignment.

Figure 4:
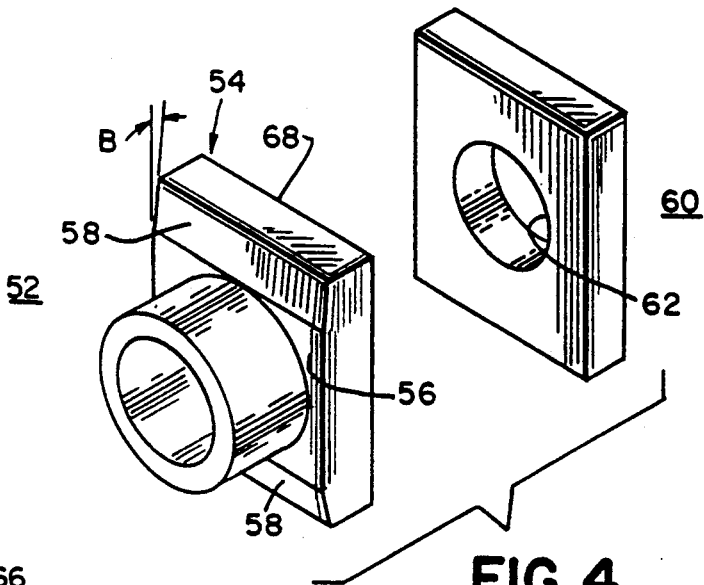
FIG. 4 represents an isometric exploded view of a flanged bushing and its associated resilient biasing means.

A pair of flanged bushings 52 are provided to pivotally mount the disc member 12. Each of the flanged bushings 52 is sized to have its outside diameter fit closely into its associated transverse aperture 50. The inside diameter of the bushing 52 provides a bearing fit with its associated shaft 16 or 18. The length of each flanged bushing 52 is such that it abuts its adjacent hub 14. The interface of the flanged bushing 52 and the hub 14 are precisely finished to provide a face seal. The flange 54 of the bushing 52, shown in greater detail in FIG. 4, is preferably rectangular for providing anti-rotation properties when assembled in the housing 22. An inner face 56 of the flange 54 is contoured to provide a pair of beveled surfaces 58. The preferred angle B of the beveled surface 58 is 5 degrees. The flanged bushing 52 is preferably made of a plastic material such as Teflon ®. The use of Teflon ® is preferred for its bearing properties as well as its sanitary properties. Of course other materials may be used in non-sanitary applications. The purpose of the beveled surfaces 58 will become apparent later in this disclosure.

Referring now to FIGS. 2; 3; and 4, each flanged bushing 52 is urged inwardly by a resilient biasing washer 60. Each of the biasing washers 60 are rectangular in outline and have an aperture 62 therethrough. The aperture 62 is sized for allowing the shaft 18 to pass therein. Each of the biasing washers 60 must be substantially identical to provide a balanced opposed biasing action. It is preferred that the biasing washers 60 be made of a 45 Durometer FDA approved rubber, but as previously noted other materials or biasing means may be used in non-sanitary applications.

It has been previously specified that the disc member 12 must have a highly polished surface. It is to be also noted that the peripheral edge 76, seen in FIG. 6, should be radiused and polished to minimize the abrasion to the valve seat 42.

USE AND OPERATION

The butterfly valve 10 of the present invention may be easily assembled or disassembled for cleaning. The disc member 10; valve seat 42; flanged bushings 52; and one of the biasing washers-60 may be installed into the housing 22 as a unit. Each flange 54 of the flanged bushings 52 are loosely seated into recesses 64 of the housing 22. It is necessary to install a biasing washer 60 between the recessed wall 66 of the housing and the flanged bushing 52. The opposing biasing washer 60 must be threaded onto the long shaft 18 prior to installation of the disc 12 into the housing 22. The rectangular flange of the flanged bushing 52 are sized to be slightly smaller than the width and depth of the recess 64 to allow a floating action, meaning that the flanged bushing 52 is supported solely by the valve seat 42. The rectangular outline 68 of the flange, seen more clearly in FIG. 4, provides anti-rotation properties. The rectangular periphery also assures a proper orientation of the beveled surfaces during assembly of the valve 10.

The biasing action of the biasing washers 60 deforms a local portion of the valve seat 42. This deformation urges the center portion of the valve seat 42 into substantial alignment with the interface 70 of the hub 14 and the flanged bushing 52, as may be seen in FIG. 2. Still referring to FIG. 2, the ends of valve seat 42 are retained by the first acute lip 32 and the second acute lip 40. It can be seen that the biasing action of the biasing washers 60 along with the beveled surface 58 provides a smooth transition between the center portion of the valve seat 42 and its retained ends.

Referring now to FIG. 3, it can be seen that the biased flanged bushings 52 also shape the valve seat 42 to provide a chordal portion 72 to align substantally with the diameter of the hub 14. As an example; a flange width of 28.45 mm. (1.120 in.) provides the desired results when used with a hub 14 having a diameter of 22.23 mm. (0.875 in.). This desired chordal portion 72 provides engagement with the peripheral edge of the disc 12 only in the closed position. Valve seat wear is reduced since the disc 12 does not rub against the valve seat 42 in the open position.

Referring now to FIG. 5, the valve seat 42 is shown in an free condition, meaning that its free length 48 is greater that the depth of the counterbore 28. The inside diameter 46 of the valve seat 42 is placed behind the first acute lip 32. The clamp ring 34 with its second acute lip 40 facing the valve seat 42 is positioned in alignment with the housing 22.

Referring now to FIG. 6, the valve seat 42 is shown in a compressed condition, between the clamp ring 34 and the shelf portion 30. This compressed condition causes only the center portion of the inside diameter 46 to collapse inwardly, thereby slightly reducing the diameter the valve seat 42 in the vicinity of the axis of the closed disc 12. This reduction in diameter provides a positive seal between the valve seat 42 and a closed disc 12, shown in the closed position. It can also be seen that a smooth through bore is provided interior of the valve 14 by this unique construction. This smooth through bore is necessary when valves are used in sanitary processing facilities.

Referring still to FIG. 5 and 6, the clamp plate may be formed with a groove 74 for seating of a sealing ring such as an O-ring; Quad-ring or the like. Of course a flat gasket may be used to provide a seal between adjoining apparatus.

It is to be noted that the disc member 12 of the present invention is supported by the valve seat 42. There is provided a clearance between the shaft 18 and a clearance aperture 78 through the wall of the housing. This support of the disc 12 by the valve seat provides a self-centering feature of the valve 10 by allowing the disc 12 to seat itself in a centered and axial alignment in the valve seat 42. This self-centering feature provides a more reliable seal between the valve seat 42 and a closed disc member 12.

As previously noted, the valve may be actuated by a manual handle or automatically by a powered actuator means, such as a rotary actuator; linear actuator or the like.

The disc 12 preferably is made of a stainless steel material along with its hubs 14, shafts 16 and 18. As an example, a 15.24 cm. (6 in.) diameter disc should have a disc thickness of 11 Ga. and the peripheral edge radius 76 of 2.54 mm. (0.100 in.).

Terms such as "left", "right", "up", "down", "bottom", "top", "front", "back", "in", "out" and the like may be used in the above description. These terms are applicable to the embodiments shown and described in conjunction with the drawings. These terms are merely for the purpose of description and do not necessarily apply to the position in which the butterfly valve of the present invention may be employed.

While these particular embodiments of the present invention have been shown and described, it is to be understood that the invention is not limited thereto and protection is sought to the broadest extent the prior art allows.

What is claimed is:

1. A butterfly valve being adapted for mounting to a flange of at least one adjacent apparatus, said butterfly valve including:
   a) a disc member adapted to be rotated between an open and a closed position, said disc member having opposed hubs, each hub having a shaft member extending therefrom, at least one of said shaft members having sufficient length for extending exterior of said butterfly valve;
   b) a housing having a first cylindrical through bore and a counterbore formed concentrically with said first through bore; said counterbore having a determined depth for providing a shelf portion; said shelf portion being contoured to form a first acute lip member at the intersection of said first through bore and said shelf member;
   c) a clamp ring being removably fastened to said housing distal from said shelf portion, said clamp ring having a second cylindrical through bore and a second acute lip member, said second through bore being substantially equal in diameter to said first through bore, said second acute lip member being positioned in opposed alignment with said first acute lip member;
   d) a resilient valve seat having an outside diameter, an inside diameter, and a free length, said outside diameter being sized to closely and removably seat into said counterbore, said free length being a determined amount greater than the depth of said counterbore, said valve seat having a transverse aperture formed therethough;
   e) at least two flanged bushings for pivotally mounting said disc member, each of said flanged bushings adapted for selective insertion into its associated aperture of said valve seat, each bushings flange portion having a rectangular periphery for providing anti-rotation properties, an inner face of each flange being selectively contoured, said rectangular flange being selectively sized to fit loosely into an associated recess in a wall of said housing;
   f) at least two biasing means, each biasing means being selectively sized to be seated in said recess in said housing for inwardly urging its associated flanged bushing to abut its associated hub of said disc member; and wherein said free length of said valve seat is compressed between said shelf member and said clamp plate while end portions of its inside diameter are retained by said first acute lip and said second acute lip, said compression of said valve seat along with its local inward urging by said inner faces of each of said flanged bushing providing a substantially total sealed condition between said valve seat and said closed disc member, said first acute lip member and said second lip member also providing a smooth transition for materials flowing through said butterfly valve.

2. A butterfly valve as recited in claim 1 wherein said inner face of said rectangular flange includes 2 beveled surfaces.

3. A butterfly valve as recited in claim 2 wherein each of said beveled surfaces is sloped at a 5 degree angle from said inner face 4. A butterfly valve as recited in claim 2 wherein said inner face of said flanged bushing is sufficiently wide for providing a chordal sealing portion of said valve seat.

5. A butterfly valve as recited in claim I wherein each of said biasing means is a resilient biasing washer.

6. A butterfly valve as recited in claim 1 wherein said first acute lip member and said second acute lip member includes one surface inclined at 45 degrees.

7. A butterfly valve as recited in claim 1 wherein said disc member is solely supported by said valve seat for providing a self-centering disc member.

8. A butterfly valve as recited in claim 1 wherein said clamp ring is removably fastened to said housing by a fastener whose head is recessed in said housing, said fastener providing a desired alignment between said clamp ring and said housing.

9. A butterfly valve as recited in claim 7 wherein said shaft member extending exterior of said housing includes a means for connection to an actuating means.

10. A butterfly valve as recited in claim 1 wherein said clamp ring includes a groove for the seating of a sealing means between said valve and said apparatus.

* * * * *